Figure 1:
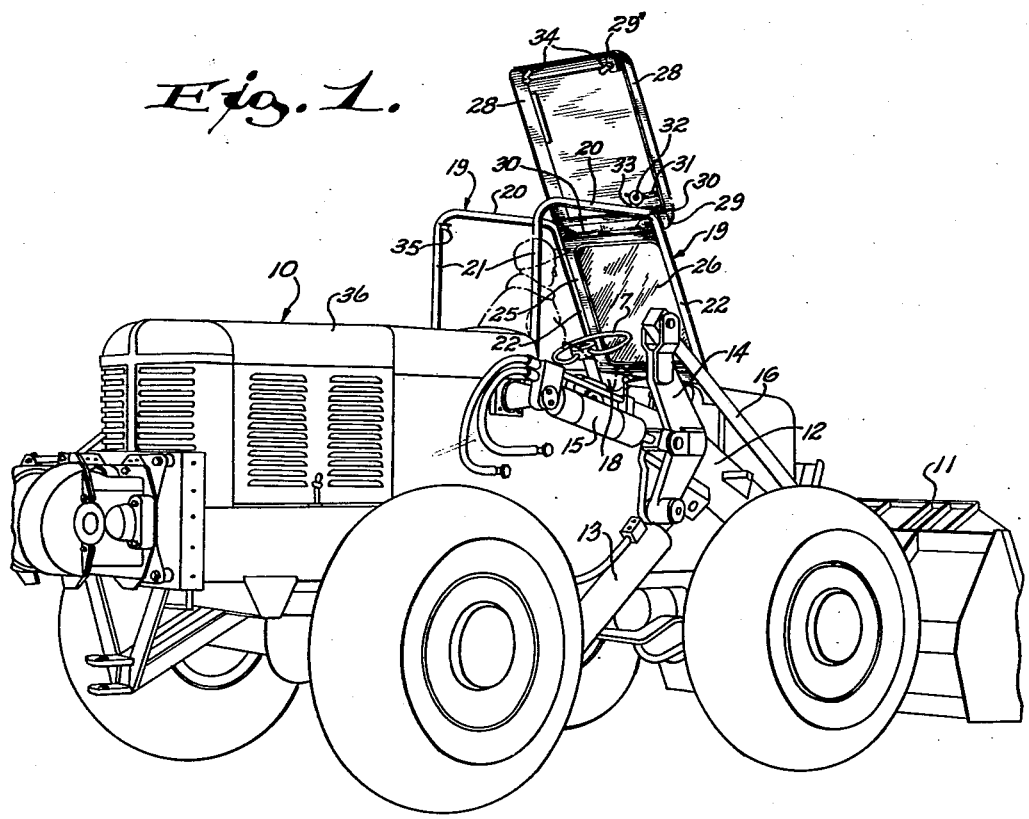

June 11, 1957  J. E. WIESCHEL  2,795,458
TRACTOR CABS
Filed Feb. 26, 1954

INVENTOR.
John E. Wieschel
BY
ATTORNEYS.

United States Patent Office 2,795,458
Patented June 11, 1957

2,795,458

TRACTOR CABS

John E. Wieschel, Milwaukee, Wis., assignor to The Heil Co., Milwaukee, Wis., a corporation of Wisconsin Application February 26, 1954, Serial No. 412,834

2 Claims. (Cl. 296—102)

This invention relates to improvements in tractor cabs.

In certain types of tractors it is necessary to have mechanism disposed at the sides of the vehicle for operating shovels, blades, or the like. This makes it impractical to provide a side door to a cab, as the above referred to mechanism would prevent access to such door. Because of the above difficulties, many tractors are delivered without any cabs, leaving the driver exposed in all types of weather.

It is a general object of the present invention to provide a very simple and inexpensive cab structure which is so worked out as to permit easy entrance from the rear after the operator has climbed on top of a rear portion of the tractor, the construction being so worked out as to provide a complete cab including a roof, together with frame members to which side and rear curtains may be fastened when required by weather conditions.

A more specific object of the invention is to provide an improved cab structure for tractors wherein the cab has a rear opening and wherein there is a swingable roof portion which is swingable to a raised position to permit an operator to walk into the rear opening of the cab without obstruction.

A more specific object of the invention is to provide a cab structure which includes two inverted U-shaped side frames, a front windshield, and a roof which is hinged, preferably adjacent the upper edge of the windshield to swing upwardly and permit access from the rear of the cab without any cross obstruction.

With the above and other objects in view, the invention consists of the improved tractor cab and all of its parts and combinations, as set forth in the claims, and all equivalents thereof.

Figure 2:
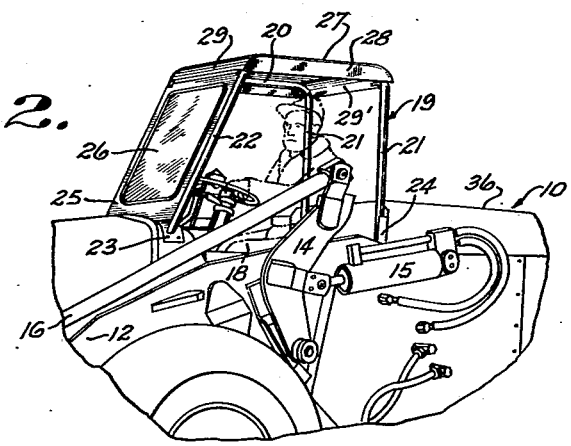

In the accompanying drawing illustrating one complete embodiment of the preferred form of the invention in which the same reference numerals designate the same parts in all of the views:

Fig. 1 is a perspective view looking principally at the side and rear of a tractor showing the improved cab structure with the roof in raised position; and Fig. 2 is a fragmentary perspective view looking principally at the opposite side of the cab from Fig. 1, showing the roof in down position.

Referring more particularly to the drawing the numeral 10 designates a vehicle, such as a four-wheeled tractor, the said tractor being illustrated as equipped with a front shovel 11. As part of the operating mechanism for the shovel there is illustrated portions of the shovel supporting arms 12, which arms extend rearwardly from the shovel and are disposed adjacent the sides of the vehicle. There is also illustrated an hydraulic cylinder 13 and associated mechanism for actuating the arms 12 to raise and lower the shovel. In addition, on both sides of the cab are intermediately pivoted levers 14 operated by hydraulic cylinders 15, there being arms 16 extending from the levers 14 to the shovel to control the dumping movements thereof.

The above mechanism forms no part of the present invention except as to show the particular utility for the present invention. It is apparent from both Figs. 1 and 2 that the members 12, 13, 14, 15, 16, and associated parts, would make it impractical for an operator to enter the cab from either side.

The tractor is equipped with the usual steering wheel 17 which projects upwardly from the driver's compartment 18. On each side of the drivers' space is an inverted U-shaped frame member 19. In the preferred embodiment of the invention, each frame member may be formed of piping bent to the shape shown. However, the frame members may be formed in various ways to provide a substantially horizontal upper portion 20, a substantially vertical rear leg 21, and an obliquely extending front leg 22. The lower end of each of the legs 22 is suitably secured to the tractor as at 23. The lower end of each of the rear legs 21 is suitably secured to the tractor as at 24. Spanning the space between the front legs 22 and having its side edges suitably secured to said legs is a frame 25 for a windshield 26.

The cab roof 27 has depending side flanges 28, a forwardly and downwardly curved front flange 29, and a rearwardly and downwardly curved rear flange 29'. When the cab roof is in the lowered cab sheltering position of Fig. 2, its rear portion 29' forms the only cross-obstruction between the frame members 21. It is a purpose of the present invention to provide means whereby this obstruction may be quickly removed when the operator desires to enter the rear opening between the upright legs 21. This may be accomplished by having a readily movable roof portion, and it is most convenient to have the entire roof swingable as shown in Fig. 1. Accordingly, in the preferred embodiment, the bottom edge of the flange 29 is suitably hinged as at 30 to an upper portion of the windshield frame to permit swinging of the cab roof from the position of Fig. 2 to the position of Fig. 1. A frictional holding bracket includes an arm 31 which is secured to the cab roof and which is frictionally pivoted as at 32 to an arm 33 which extends from one of the cab side frames 19. This type of bracket is well known and is capable of holding the cab roof in the raised position of Fig. 1 or in any partially raised position, due to the friction at the pivot 32.

It is also preferred to equip the rear portion of the roof with pivoted latch members 34 which may coact with stationary latch parts 35 on the cab sides 19 to latch the roof in the lowered position of Fig. 2. In this lowered position the side flanges 28 embrace the horizontal top portions 20 of the frame members 19.

With the present invention it is apparent that when the operator wishes to enter the cab, he climbs on top of the tractor portion 36, releases the latches 34 and raises the roof to the position of Fig. 1. It will be noted that this removes any cross-obstruction at the rear between the legs 21 of the cab side frames so that the operator can easily enter without bending. After he is in the cab he can lower the roof 27 and latch it in covering position.

For use in inclement weather, removable curtains (not shown) may be provided to cover the spaces between the legs 21 and 22, and to cover the rear space between the legs 21.

It is obvious that the improved cab structure is suitable for use on any type of vehicle where side entry is obstructed.

Various changes and modifications may be made without departing from the spirit of the invention, and all of such changes are contemplated, as may come within the scope of the claims.

What I claim is:

1. In a vehicle having a body and having a driver's compartment in said body open at the top, an inverted U-shaped cab side frame member projecting upwardly from each side of the body at the sides of said driver's compartment and having spaced top portions and spaced rear upright legs, a windshield having a frame which connects front portions of said cab frame side members, and a rigid relatively shallow cab roof hingedly connected at its forward edge to the upper portion of said windshield frame for swingable movement upwardly and forwardly to open the top, said roof having a rigid rear edge which forms a rigid brace and the only connection between the upper portions of said rear upright legs when the roof is down, and there being a space below the rear edge of the roof and between the rear upright legs of the side frame members when the roof is down which is normally open substantially throughout the height of said rear upright legs, said space between the rear legs communicating with the space between the spaced top frame portions when the roof is up whereby the driver may enter the cab from the rear while standing up with part of his body accommodated between the spaced top portions of the cab side frame members.

2. In a vehicle having a body and having a driver's compartment in said body open at the top, a frame side member projecting upwardly from each side of the body at the sides of the driver's compartment and having spaced top portions and spaced rear upright edges, a windshield having a frame which connects front portions of said cab frame side members, and a rigid relatively shallow cab roof hingedly connected at its forward edge to the upper portion of said windshield frame for swingable movement upwardly and forwardly to open the top, said roof having a rigid rear edge which forms a rigid brace and the only connection between the upper portions of said rear upright edges when the roof is down, and there being a space below the rear edge of the roof and between the rear upright edges of the side frame members when the roof is down which is normally open substantially throughout the height of said rear upright edges, said space between the rear edges communicating with the space between the spaced top frame portions when the roof is up whereby the driver may enter the cab from the rear while standing up with part of his body accommodated between the spaced top portions of the cab side frame members.

References Cited in the file of this patent

UNITED STATES PATENTS

| | | |
|---|---|---|
| 1,868,382 | Coadou | July 19, 1932 |
| 2,256,890 | Brown et al. | Sept. 23, 1941 |
| 2,430,442 | Acheson | Nov. 11, 1947 |
| 2,532,948 | Sanden | Dec. 5, 1950 |
| 2,557,339 | Campbell | June 19, 1951 |
| 2,596,903 | Kropp | May 13, 1952 |
| 2,631,057 | Weaklend | Mar. 10, 1953 |

FOREIGN PATENTS

| | | |
|---|---|---|
| 808,412 | Germany | July 16, 1951 |
| 660,542 | Great Britain | Nov. 7, 1951 |